United States Patent
Salesman et al.

(10) Patent No.: US 11,125,482 B2
(45) Date of Patent: Sep. 21, 2021

(54) LUBRICANT QUALITY MANAGEMENT FOR A COMPRESSOR

(71) Applicant: TRANE INTERNATIONAL INC., Davidson, NC (US)

(72) Inventors: Aaron Salesman, Viroqua, WI (US); Kevin P. Hughes, La Crosse, WI (US)

(73) Assignee: TRANE INTERNATIONAL INC., Davidson, NC (US)

( * ) Notice: Subject to any disclaimer, the term of this patent is extended or adjusted under 35 U.S.C. 154(b) by 207 days.

(21) Appl. No.: 16/428,062

(22) Filed: May 31, 2019

(65) Prior Publication Data

US 2020/0378668 A1 Dec. 3, 2020

(51) Int. Cl.

| F25B 49/02 | (2006.01) |
|---|---|
| F25B 31/00 | (2006.01) |
| F25B 1/047 | (2006.01) |
| F25B 43/02 | (2006.01) |

(52) U.S. Cl.
CPC ............ *F25B 49/022* (2013.01); *F25B 1/047* (2013.01); *F25B 31/004* (2013.01); *F25B 31/006* (2013.01); *F25B 43/02* (2013.01); F25B 2500/16 (2013.01); F25B 2600/0253 (2013.01)

(58) Field of Classification Search
CPC .... F25B 49/022; F25B 31/004; F25B 31/006; F25B 43/02; F25B 2500/16; F25B 2600/0253; F25B 2700/2105; F25B 2700/21151; F25B 2700/21152; F25B 31/002; F25B 49/02; Y02B 30/70; F04C 29/02; F04C 29/026; F04C 29/04

USPC ......................................................... 62/228.4
See application file for complete search history.

(56) References Cited

U.S. PATENT DOCUMENTS

| 8,459,053 B2 | 6/2013 | Pham et al. | |
| 2011/0110791 A1* | 5/2011 | Donnat | B60H 1/3232 |
| | | | 417/18 |
| 2015/0056059 A1* | 2/2015 | Crane | F04D 27/002 |
| | | | 415/1 |
| 2016/0061507 A1 | 3/2016 | Penn, II et al. | |
| 2017/0241689 A1 | 8/2017 | Brostrom et al. | |

OTHER PUBLICATIONS

Extended European Search Report, European Patent Application No. 20177637.4, dated Oct. 30, 2020 (7 pages).

(Continued)

*Primary Examiner* — Ana M Vazquez
(74) *Attorney, Agent, or Firm* — Hamre, Schumann, Mueller & Larson, P.C.

(57) ABSTRACT

A heating, ventilation, air conditioning, and refrigeration (HVACR) system is disclosed. The HVACR system includes a refrigerant circuit. The refrigerant circuit includes a compressor, a condenser, an expansion device, and an evaporator fluidly connected. A controller is electronically connected to the compressor. The controller is configured to prevent the compressor from operating at a speed that is less than a minimum speed limit. A lubricant separator has an inlet fluidly connected between the compressor and the condenser and a plurality of outlets. A first of the plurality of outlets is fluidly connected to the condenser. A second of the plurality of outlets is fluidly connected to one or more components of the compressor to provide a lubricant to the one or more components.

19 Claims, 10 Drawing Sheets

(56) References Cited

OTHER PUBLICATIONS

"Copeland Scroll (TM) Variable Speed Compressors XHV0181P Application Guidelines", Jan. 1, 2017, XP055741510, Available online at: https//climate.emerson.com/documents/copeland-scroll-variable-speed-compressors-xhv0181p-to-xhv0382p-application-guidelines-en-gb-5260810.pdf, p. 3, p. 8, figures 4-6 (cited in Extended European Search Report).

* cited by examiner

LUBRICANT QUALITY MANAGEMENT FOR A COMPRESSOR

FIELD

This disclosure relates generally to a heating, ventilation, air conditioning, and refrigeration (HVACR) system. More specifically, this disclosure relates to lubricant quality management for a compressor in an HVACR system.

BACKGROUND

A heating, ventilation, air conditioning, and refrigeration (HVACR) system generally includes a compressor. Compressors, such as, but not limited to, screw compressors and scroll compressors, utilize bearings to support a rotating shaft. The bearings generally include a lubricant system. If the bearings are not properly lubricated, the bearings, and ultimately the compressor, may fail prior to an expected lifetime of the bearing.

SUMMARY

This disclosure relates generally to a heating, ventilation, air conditioning, and refrigeration (HVACR) system. More specifically, this disclosure relates to lubricant quality management for a compressor in an HVACR system.

In an embodiment, an HVACR system includes a variable speed compressor. In an embodiment, the variable speed compressor is a positive displacement compressor.

In an embodiment, the variable speed compressor is a variable speed screw compressor. In an embodiment, the variable speed screw compressor can be operated between a minimum and a maximum speed. In an embodiment, a minimum speed limit can be set to be a value that is greater than a minimum speed at which the variable speed compressor is capable of operating. For example, a minimum speed limit can be determined for a selected compressor efficiency and bearing size based on a saturated suction temperature and a saturated discharge temperature of a selected refrigerant and lubricant.

In an embodiment, the minimum speed limit can be determined based on the saturated suction temperature, the saturated discharge temperature, and a lubricant temperature. In an embodiment, the lubricant temperature can be a measured value. In an embodiment, the lubricant temperature can be a relative lubricant temperature that is a difference between the measured lubricant temperature and the saturated discharge temperature.

In an embodiment, the selected refrigerant includes a refrigerant having a low discharge superheat and that is miscible with the selected lubricant, which can result in a high lubricant dilution.

In an embodiment, the selected refrigerant includes a refrigerant having a relatively lower global warming potential (GWP) than R-134a and that may be utilized as a replacement refrigerant for R-134a.

In an embodiment, the selected refrigerant can be R1234ze(E), R-513A, R1234yf, or the like.

In an embodiment, the minimum speed limit is inversely related to bearing size. That is, in an embodiment, as bearing size decreases, the minimum speed limit increases.

In an embodiment, the HVACR system includes a lubricant separator. The lubricant separator can incorporate a lubricant tank. In an embodiment, combining the lubricant separator and the lubricant tank may reduce an overall complexity of the HVACR system.

A heating, ventilation, air conditioning, and refrigeration (HVACR) system is disclosed. The HVACR system includes a refrigerant circuit. The refrigerant circuit includes a compressor, a condenser, an expansion device, and an evaporator fluidly connected. A controller is electronically connected to the compressor. The controller is configured to prevent the compressor from operating at a speed that is less than a minimum speed limit. A lubricant separator has an inlet fluidly connected between the compressor and the condenser and a plurality of outlets. A first of the plurality of outlets is fluidly connected to the condenser. A second of the plurality of outlets is fluidly connected to one or more components of the compressor to provide a lubricant to the one or more components.

A method of controlling a variable speed compressor is also disclosed. The method includes determining, using a controller of the variable speed compressor, a saturated suction temperature, and a saturated discharge temperature and calculating, using the controller of the variable speed compressor, a minimum speed limit for the variable speed compressor based on the saturated suction temperature and the saturated discharge temperature. The controller receives a cooling requirement and determines a speed setting for the variable speed compressor based on the cooling requirement. In response to determining that the speed setting is less than the minimum speed limit as calculated, the controller overrides the speed setting and utilizes the minimum speed limit and cools to meet the cooling requirement.

A lubricant separator for a heating, ventilation, air conditioning, and refrigeration (HVACR) system is also disclosed. The lubricant separator includes a first chamber and a second chamber. A conduit disposed in the first chamber fluidly connects the first chamber to the second chamber. The first chamber includes an inlet that receives a high pressure refrigerant/lubricant mixture and an outlet that provides a high pressure refrigerant. The second chamber receives a lubricant portion of the refrigerant/lubricant mixture via the conduit. The second chamber includes an outlet via which a low pressure lubricant is provided.

BRIEF DESCRIPTION OF THE DRAWINGS

References are made to the accompanying drawings that form a part of this disclosure, and which illustrate embodiments in which the systems and methods described in this specification can be practiced.

Like reference numbers represent like parts throughout.

DETAILED DESCRIPTION

Figure 1:
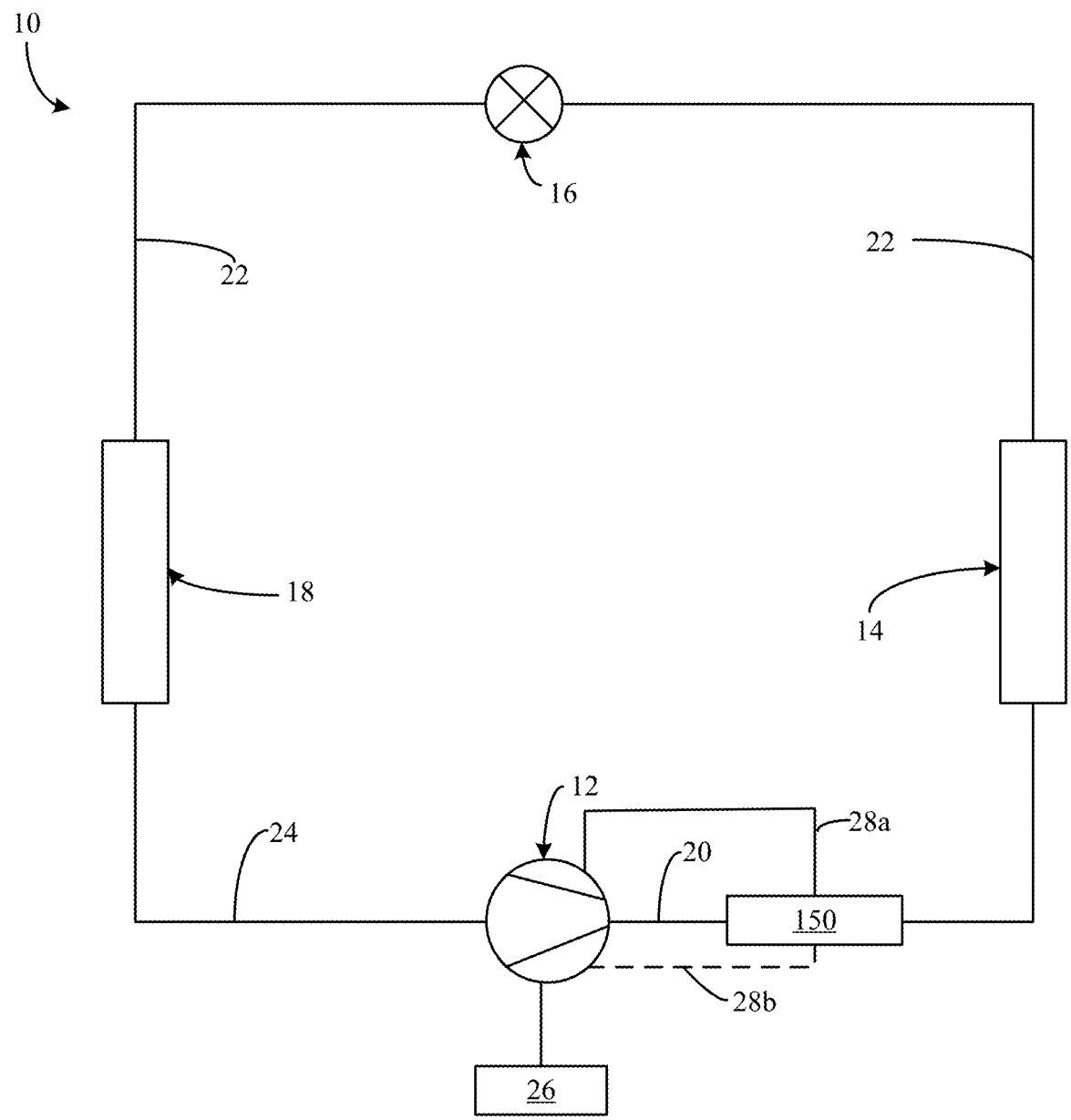
FIG. 1 is a schematic diagram of a refrigerant circuit, according to an embodiment.

This disclosure relates generally to a heating, ventilation, air conditioning, and refrigeration (HVACR) system. More specifically, this disclosure relates to lubricant quality management for a compressor in an HVACR system.

Environmental impacts of HVACR refrigerants are a growing concern. For example, since 2011, the European Union has been phasing out refrigerants with a global warming potential (GWP) of more than, for example, 150 in some refrigeration systems. Environmentally-suitable HVACR refrigerants, with suitable properties such as density, vapor pressure, heat of vaporization, and suitable chemical properties, which satisfy the requirements regarding safety and environment impacts, such as the European Union Standard discussed above, can be utilized for HVACR systems. The environmentally-suitable HVACR refrigerants are nonflammable or mildly flammable, non-ozone depleting, energy efficient, low in toxicity, compatible with materials of construction, and are chemically stable over the life of the equipment.

Current refrigerants, such as R134a or the like, may have relatively higher GWPs. For example, R134a has a GWP of 1,430. As a result, replacement refrigerants such as, but not limited to, R1234ze(E), R513A, and the like, are being implemented in HVACR systems.

In utilizing newer refrigerant compositions such as, but not limited to, R1234ze(E) and R513A, various problems may arise as a result of the different properties of the refrigerant compared to prior refrigerants such as R134a. In general, refrigerants with lower GWPs such as R1234ze(E), R513A, and the like may be carried over into the lubricant. In some instances, the replacement refrigerants are relatively more miscible in the lubricant than the current refrigerants, resulting in a higher concentration of refrigerant within the lubricant (e.g., lubricant dilution).

As a result, portions of an operating map for a compressor of the HVACR system may suffer from higher lubricant dilution and limited bearing viscosity (i.e., limited viscosity of the lubricant and refrigerant mixture at the bearings) due to low discharge superheat. In some instances, the higher lubricant dilution and limited bearing viscosity problems may be more significant when the variable speed compressor operates at relatively lower speeds. Higher lubricant dilution and limited bearing viscosity can result in, for example, a shortened lifetime for the bearings and ultimately compressor failures. In some instances, utilizing the R134A replacement refrigerants may require a replacement of the mechanical components (e.g., bearings, etc.) in the compressor.

In other instances, controlling a variable speed compressor to maximize efficiency can also result in lubricant dilution problems, even when utilizing the current refrigerants such as R134a.

In general, lubricants utilized with R134a replacement refrigerants suffer the higher lubricant dilution problem. The lubricants can include any suitable lubricant which is miscible with the selected replacement refrigerant.

In general, higher lubricant dilution may become a problem when discharge superheat becomes relatively low. For example, higher lubricant dilution can occur when the discharge superheat is below at or about 8° C.

In an embodiment, a minimum speed limit can be set for a variable speed compressor to limit or avoid reaching operating conditions in which higher lubricant dilution and limited bearing viscosity are problematic. As a result, existing mechanical components (e.g., bearings, etc.) may be utilized. Providing a minimum speed limit for the variable speed compressor can, for example, control a pitch velocity (average diameter times the speed) of the bearing. As a result, a bearing lifetime can be improved. In an embodiment, the minimum speed limit can be selected based on saturated suction and discharge temperatures in combination with a compressor frame size. In an embodiment, the compressor frame size can include a bearing size and compressor efficiency.

In an embodiment, a compressor for an HVACR system is a screw compressor. In an embodiment, the screw compressor is a variable speed screw compressor capable of operating at various speeds between a minimum speed and a maximum speed.

According to an embodiment, a minimum speed for a variable speed compressor can be selected based on discharge superheat.

In an embodiment, the minimum speed for the variable speed compressor can be selected based on a saturated suction temperature and a saturated discharge temperature.

FIG. 1 is a schematic diagram of a refrigerant circuit 10, according to an embodiment. The refrigerant circuit 10 generally includes a compressor 12, a condenser 14, an expansion device 16, an evaporator 18, and a lubricant separator 150.

The refrigerant circuit 10 is an example and can be modified to include additional components. For example, in an embodiment, the refrigerant circuit 10 can include other components such as, but not limited to, an economizer heat exchanger, one or more flow control devices, a receiver tank, a dryer, a suction-liquid heat exchanger, or the like.

The refrigerant circuit 10 can generally be applied in a variety of systems used to control an environmental condition (e.g., temperature, humidity, air quality, or the like) in a space (generally referred to as a conditioned space). Examples of such systems include, but are not limited to, HVACR systems, transport refrigeration systems, or the like.

The compressor 12, condenser 14, expansion device 16, and evaporator 18 are fluidly connected via refrigerant lines 20, 22, 24. In an embodiment, the refrigerant lines 20, 22, and 24 can alternatively be referred to as the refrigerant conduits 20, 22, and 24, or the like.

In an embodiment, the refrigerant circuit 10 can be configured to be a cooling system (e.g., an air conditioning system) capable of operating in a cooling mode. In an embodiment, the refrigerant circuit 10 can be configured to be a heat pump system that can operate in both a cooling mode and a heating/defrost mode.

The refrigerant circuit 10 can operate according to generally known principles. The refrigerant circuit 10 can be configured to heat or cool a gaseous process fluid (e.g., a heat transfer medium or fluid such as, but not limited to, air or the like), in which case the refrigerant circuit 10 may be generally representative of an air conditioner or heat pump.

In operation, the compressor 12 compresses a working fluid (e.g., a heat transfer fluid such as a refrigerant or the like) from a relatively lower pressure gas (e.g., suction pressure) to a relatively higher-pressure gas (e.g., discharge pressure). In an embodiment, the compressor 12 can be a positive displacement compressor. In an embodiment, the positive displacement compressor can be a screw compressor, a scroll compressor, a reciprocating compressor, or the like. In an embodiment, the compressor 12 can be a centrifugal compressor.

The relatively higher-pressure gas is also at a relatively higher temperature, which is discharged from the compressor 12 and flows through refrigerant line 20 to the condenser 14. The working fluid flows through the condenser 10 and rejects heat to a process fluid (e.g., water, air, etc.), thereby cooling the working fluid. The cooled working fluid, which is now in a liquid form, flows to the expansion device 16 via the refrigerant line 22. The expansion device 16 reduces the pressure of the working fluid. As a result, a portion of the working fluid is converted to a gaseous form. An "expansion device" may also be referred to as an expander. In an embodiment, the expander may be an expansion valve, expansion plate, expansion vessel, orifice, or the like, or other such types of expansion mechanisms. It is to be appreciated that the expander may be any type of expander used in the field for expanding a working fluid to cause the working fluid to decrease in temperature.

The working fluid, which is now in a mixed liquid and gaseous form flows to the evaporator 18 via the refrigerant line 22. The working fluid flows through the evaporator 18 and absorbs heat from a process fluid (e.g., water, air, etc.), heating the working fluid, and converting it to a gaseous form. The gaseous working fluid then returns to the compressor 12 via the refrigerant line 24. The above-described process continues while the refrigerant circuit is operating, for example, in a cooling mode (e.g., while the compressor 12 is enabled).

The refrigerant circuit 10 can include a lubricant separator 150 disposed between the compressor 12 and the condenser 14. The lubricant separator 150 is fluidly connected to a discharge of the compressor 12 via the refrigerant line 20. The lubricant separator 150 is fluidly connected to the compressor 12 to provide lubricant to various components of the compressor 12 (e.g., bearings, etc.) via lubricant return line 28a and optionally via a second lubricant return line 28b. It will be appreciated that the number of lubricant return lines 28a, 28b can be selected based on, for example, which components of the compressor are being provided with lubricant.

Figure 2A:
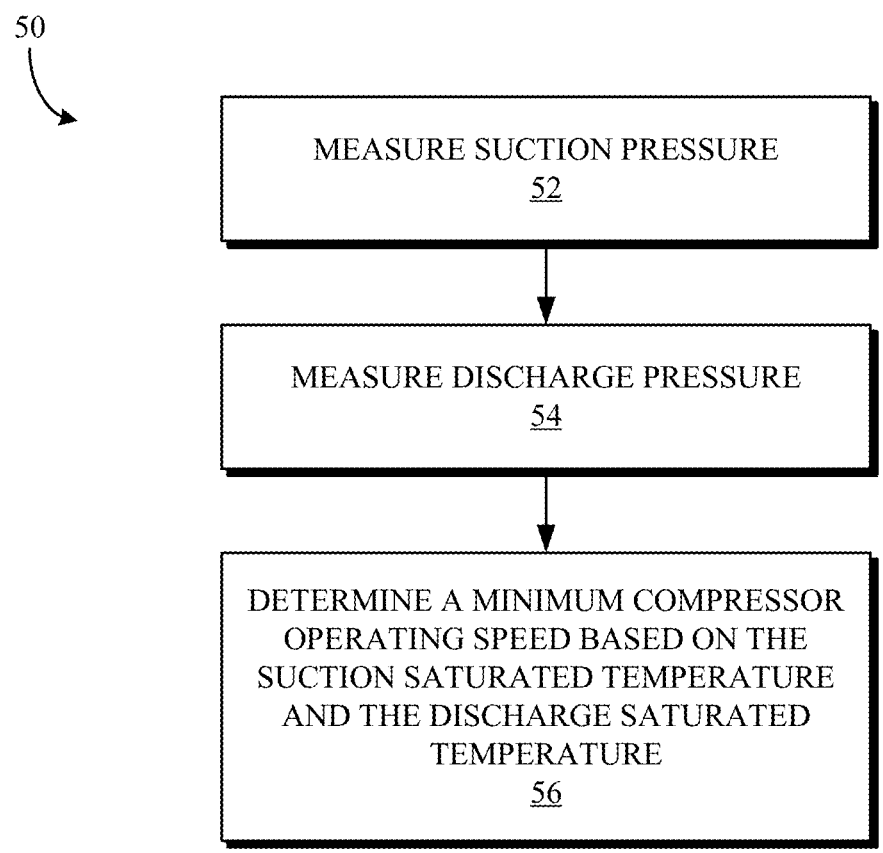
FIG. 2A is a flowchart of a method for determining a minimum speed limit for a variable speed compressor, according to an embodiment.

FIG. 2A is a flowchart of a method 50 for determining a minimum speed limit for a variable speed compressor (e.g., the compressor 12 in FIG. 1), according to an embodiment. The method 50 may be specific to a selected compressor size. The selected compressor size and corresponding execution of the method 50 can be based on, for example, a size of the bearings in the compressor and an efficiency requirement of the compressor. The method 50 can be performed by a controller (e.g., the controller 26 in FIG. 1) of the compressor, according to an embodiment. In an embodiment, the method 50 can be performed for a family of compressors and the determined minimum speed limit can be included in the controls of the compressor. An example of a control method for the compressor 12 is shown and described in accordance with FIG. 3 below.

At 52 a suction pressure is measured for the HVACR system. The suction pressure in combination with the refrigerant selected (e.g., R-134a, R1234ze(E), R-513A, etc.) can be used to determine the saturated suction temperature. In an embodiment, a suction temperature can alternatively be measured, although assumptions would have to be made regarding an amount of superheat which may make the determination less accurate than using the suction pressure.

At 54 a discharge pressure is measured for the HVACR system. The discharge pressure in combination with the refrigerant selected (e.g., R-134a, R1234ze(E), R-513A, etc.) can be used to determine the saturated discharge temperature. In an embodiment, a discharge temperature can alternatively be measured, although assumptions would have to be made regarding an amount of superheat which may make the determination less accurate than using the discharge pressure.

At 56, the selected saturated suction temperature and the selected saturated discharge temperature are used to determine a minimum speed limit for the variable speed compressor. The minimum speed limit generally is dependent upon the refrigerant, the lubricant, the bearing size in the compressor, and the compressor performance. In an embodiment, as the bearing size decreases, the minimum speed limit increases. The minimum speed limits can be determined, for example, by testing or modeling discharge temperatures of the variable speed compressor relative to bearing cavity temperatures for the bearings in the variable speed compressor and performing a surface fit to determine a minimum speed limit equation. In general, when the bearing reaches a pitch velocity below or at or about 300,000 mm/min, a minimum speed limit may be needed to prevent higher lubricant dilution and/or a loss of the bearing lubricant film. Accordingly, a pitch velocity below or at or about 300,000 mm/min may be considered a lower speed while above 300,000 mm/min may be considered a higher speed.

Figure 4:
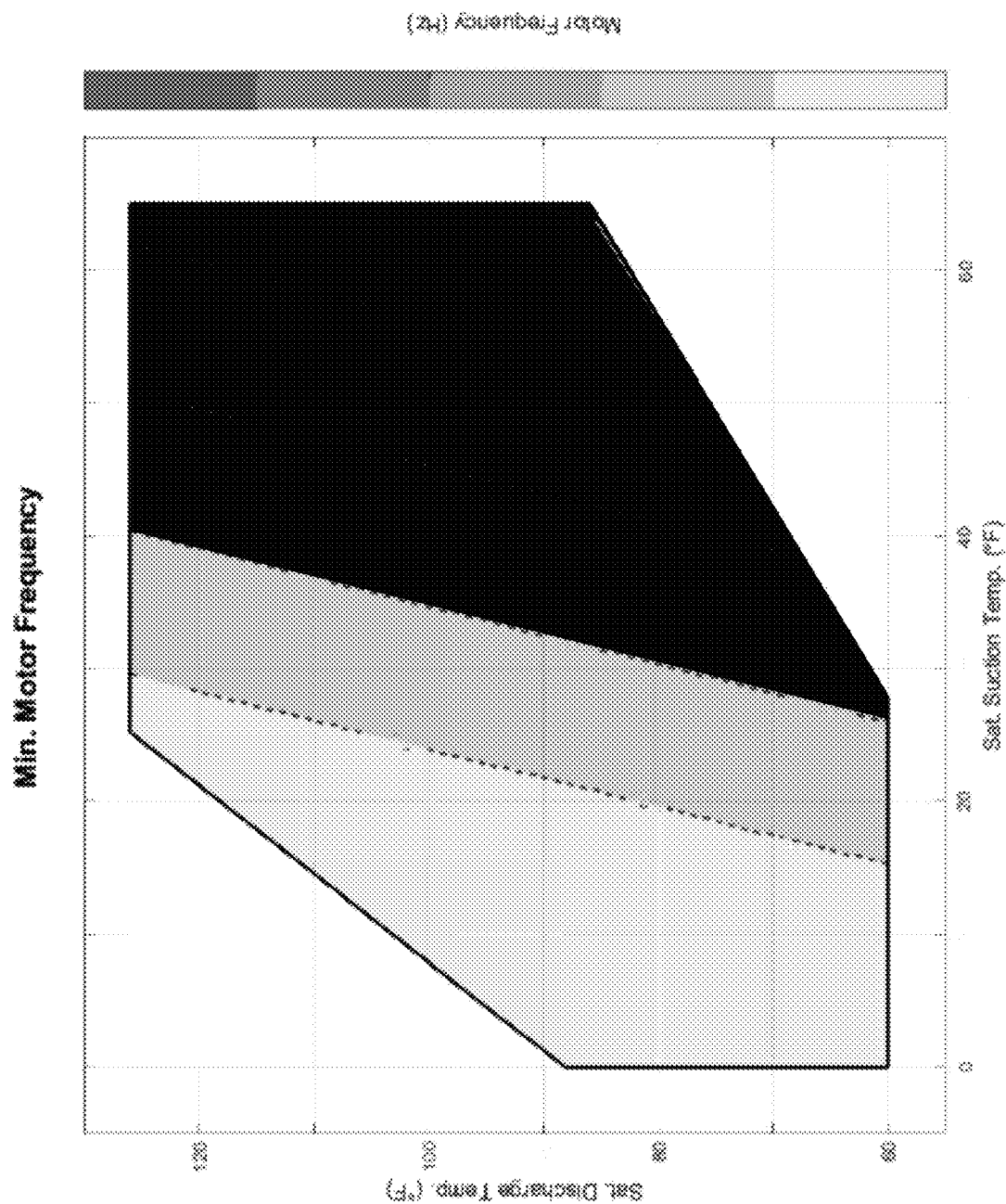
FIG. 4 illustrates a minimum operating frequency for a variable speed motor in an HVACR system, according to an embodiment.
Figure 5A:
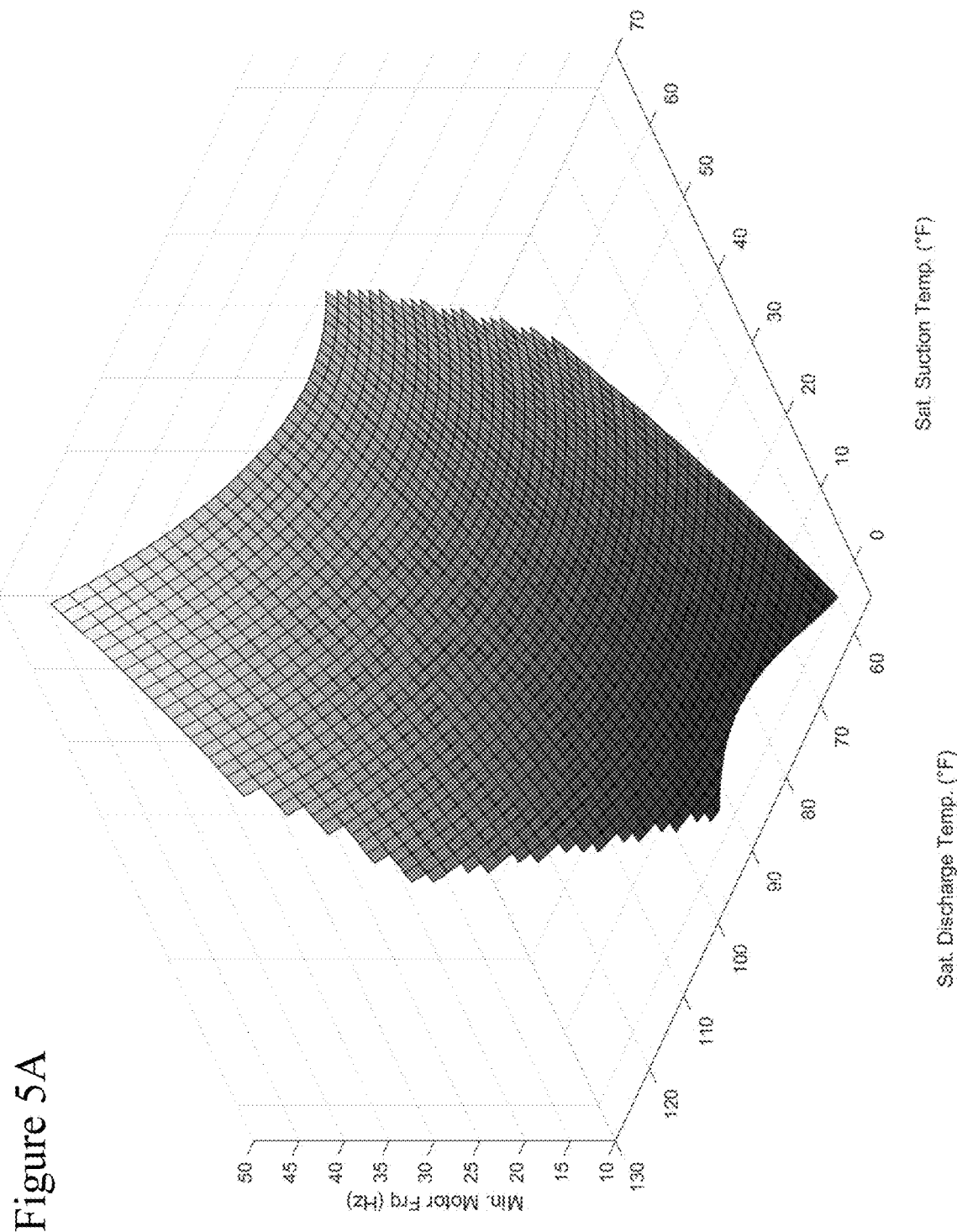
FIGS. 5A-5E illustrate a minimum operating frequency for a variable speed motor in an HVACR system, according to an embodiment.
Figure 5B:
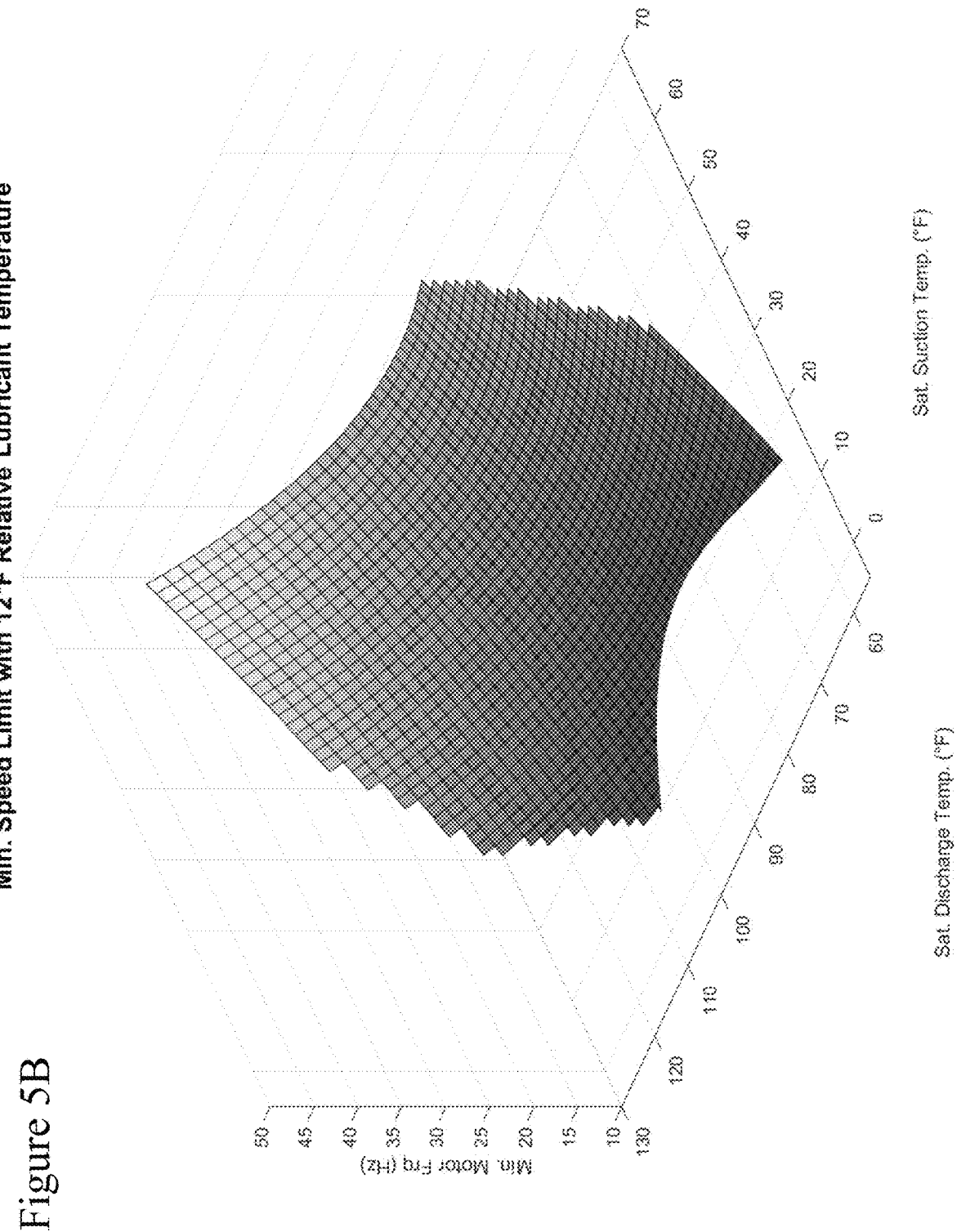
Figure 5C:
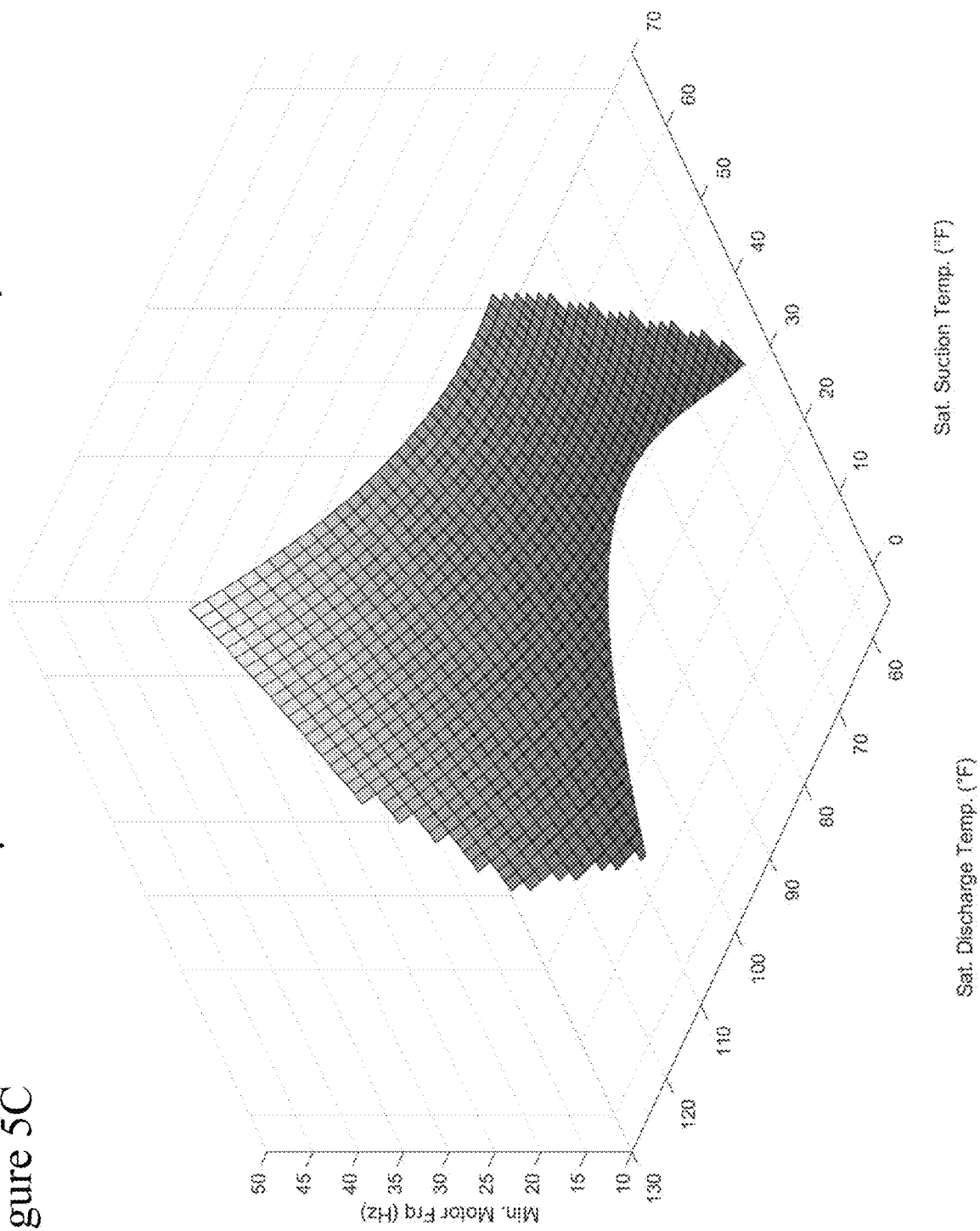
Figure 5D:
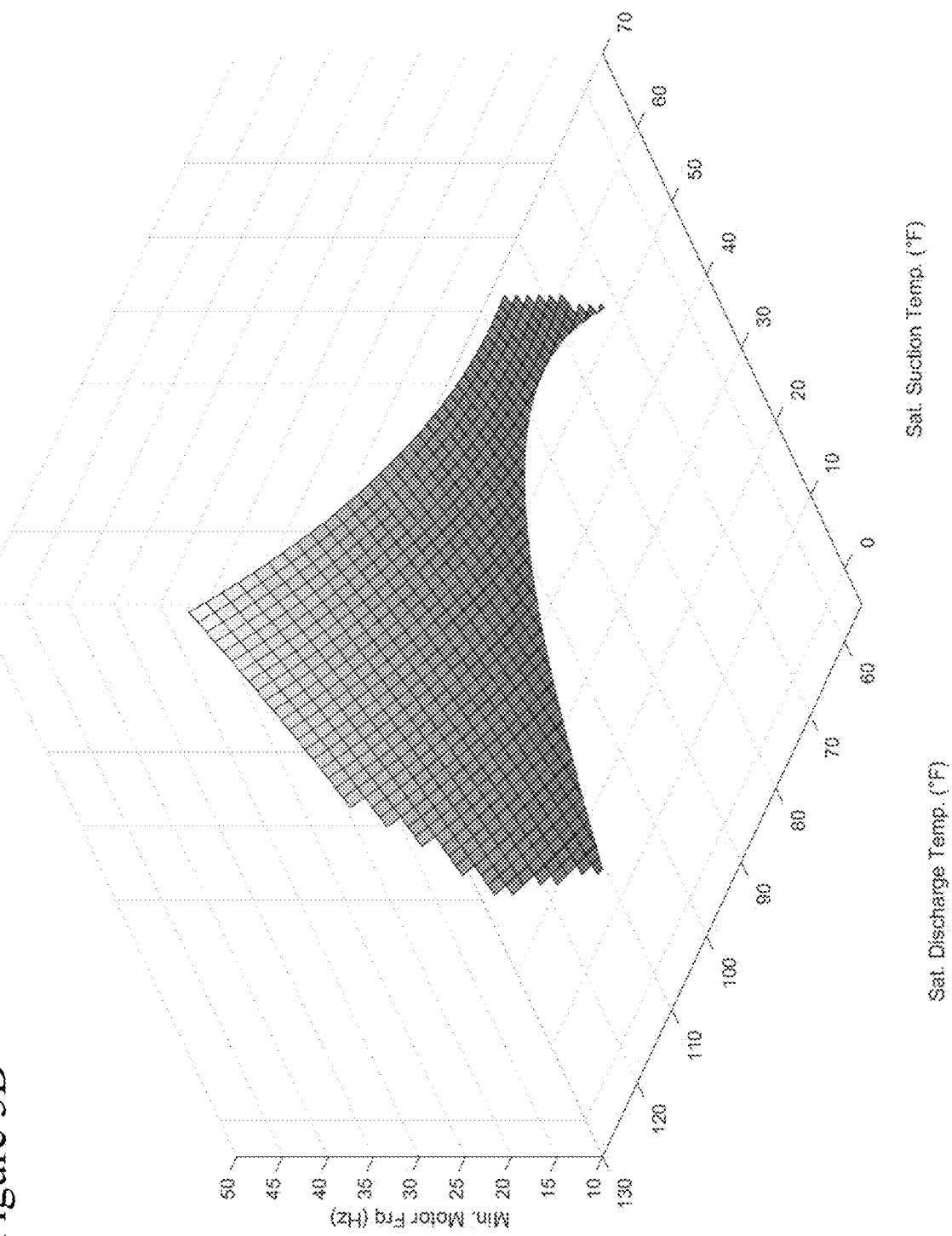
Figure 5E:
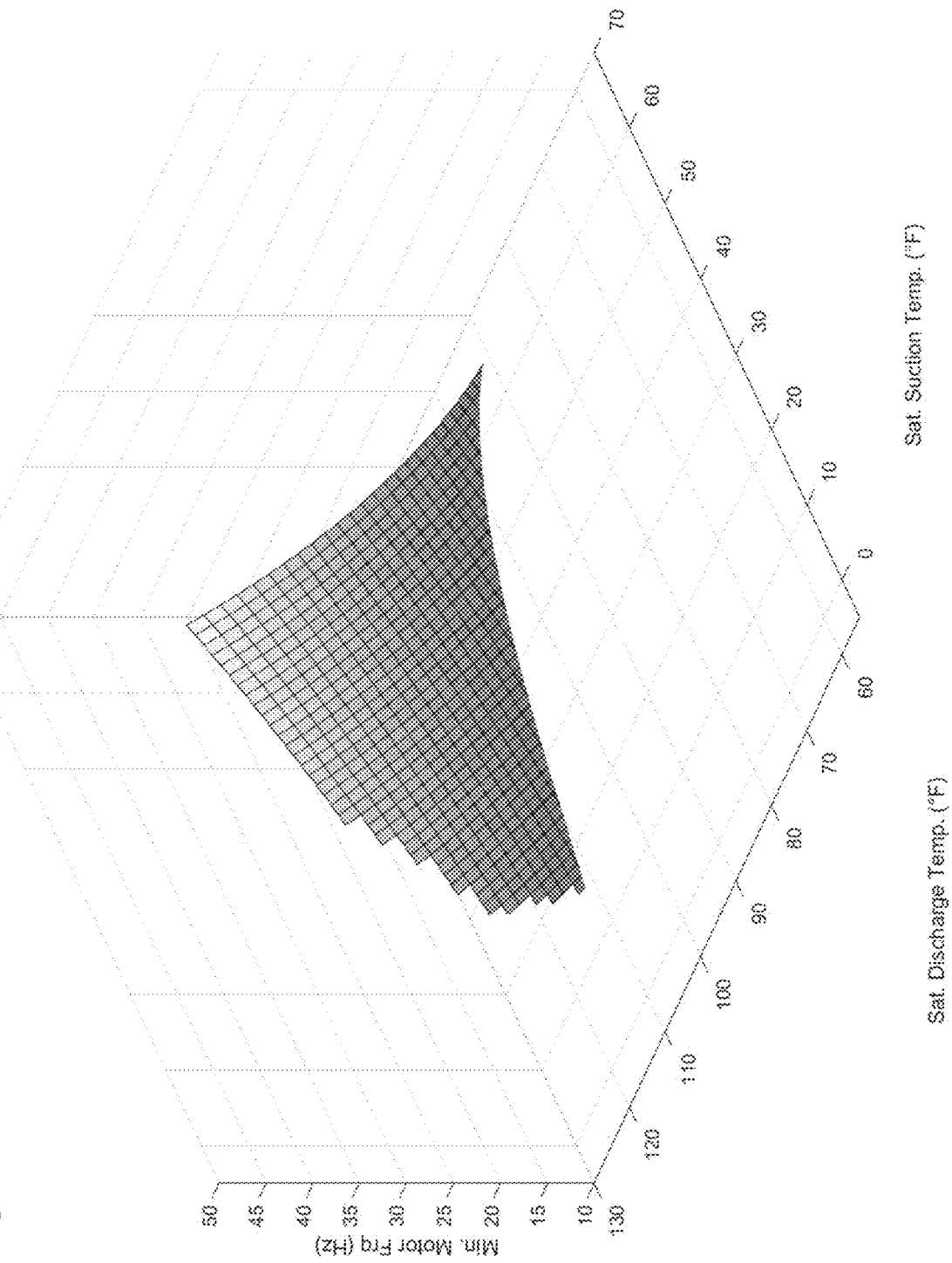

With reference to FIG. 4, example minimum motor frequencies as determined according to the method 50 are shown, according to an embodiment. FIG. 4 represents a selected bearing size. It will be appreciated that the minimum motor frequency plot in FIG. 4 is dependent upon a refrigerant selected (e.g., R1234ze(E), etc.), a bearing size, and a lubricant selected. In the figure, the x-axis shows the saturated suction temperature (in ° F.) and the y-axis shows the saturated discharge temperature (in ° F.). The motor frequencies are represented from relatively lower to relatively higher in various shades. As shown in the figure, at lower saturated suction and saturated discharge temperatures, the minimum motor frequency is relatively lower than at relatively higher saturated suction and saturated discharge temperatures.

Figure 2B:
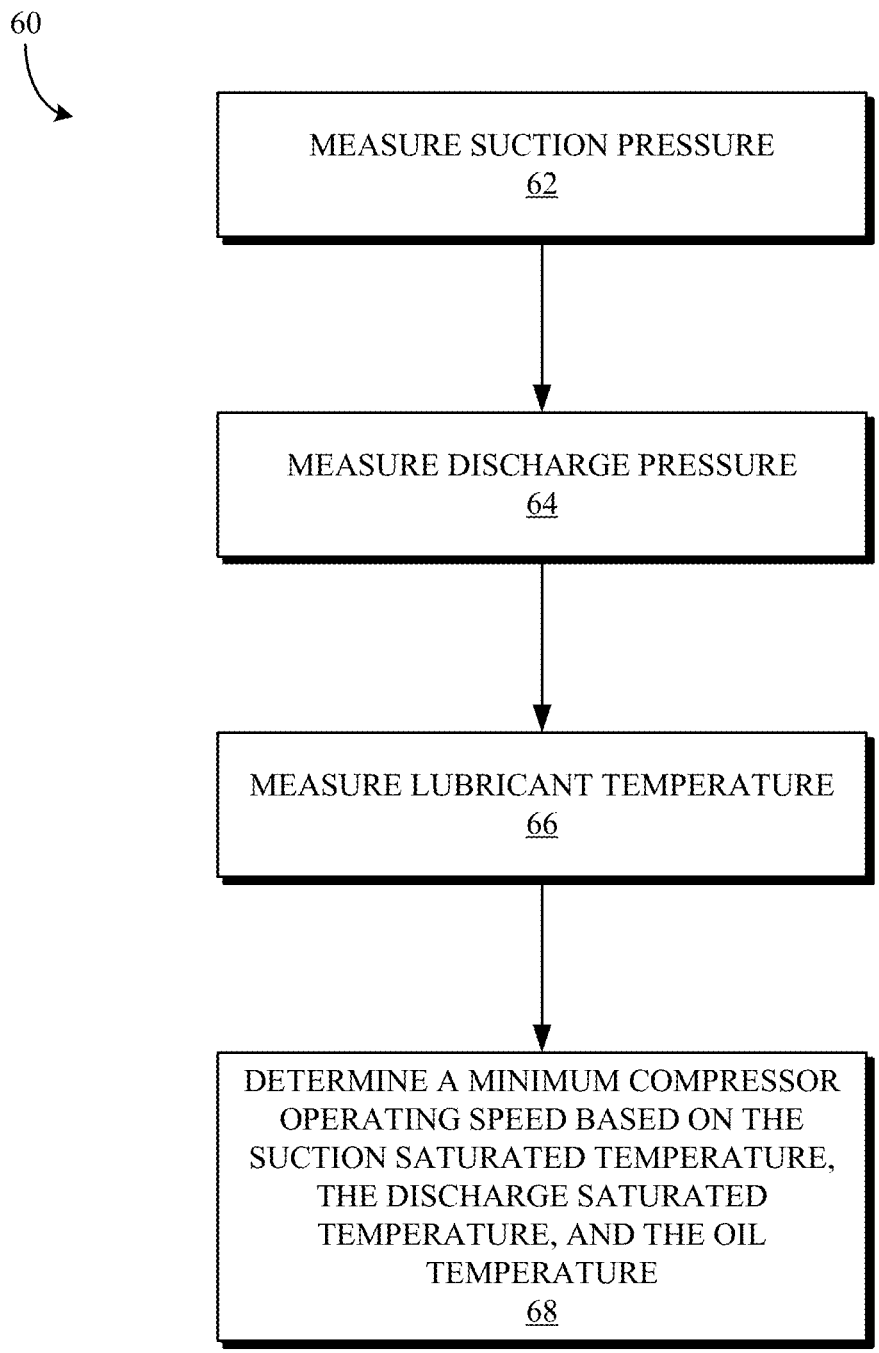
FIG. 2B is a flowchart of a method for determining a minimum speed limit for a variable speed compressor, according to another embodiment.

FIG. 2B is a flowchart of a method 60 for determining a minimum speed limit for a variable speed compressor (e.g., the compressor 12 in FIG. 1), according to an embodiment. The method 60 may be specific to a selected compressor size and to a selected lubricant and refrigerant combination. The selected compressor size and corresponding execution of the method 60 can be based on, for example, a size of the bearings in the compressor, the efficiency of the compressor, and the solubility of the lubricant and the refrigerant mixture. The method 60 can be performed by a controller (e.g., the controller 26 in FIG. 1) of the compressor, according to an embodiment. In an embodiment, the method 60 can be performed for a family of compressors and the determined minimum speed limit can be included in the controls of the compressor. An example of a control method for the compressor 12 is shown and described in accordance with FIG. 3 below.

At 62 a suction pressure is measured for the HVACR system. The suction pressure in combination with the refrigerant selected (e.g., R-134a, R1234ze(E), R-513A, etc.) can be used to determine the saturated suction temperature. In an embodiment, a suction temperature can alternatively be measured, although assumptions would have to be made regarding an amount of superheat which may make the determination less accurate than using the suction pressure.

At 64 a discharge pressure is measured for the HVACR system. The discharge pressure in combination with the refrigerant selected (e.g., R-134a, R1234ze(E), R-513A, etc.) can be used to determine the saturated discharge temperature At 66, a lubricant temperature is measured for the compressor 12. In an embodiment, the lubricant temperature can be assumed instead of measured. In such an embodiment, an assumption can be made that the lubricant temperature is the same as the saturated discharge temperature. The lubricant temperature can be used to determine a relative lubricant temperature. The relative lubricant temperature can be based on the lubricant temperature and the saturated discharge temperature. For example, the relative lubricant temperature can be the difference between the lubricant temperature as measured and the saturated discharge temperature. The lubricant temperature can provide a more accurate view of the operating conditions in the HVACR system than the method 50 in FIG. 2A.

At 68, the selected saturated suction temperature, the selected saturated discharge temperature, and the lubricant temperature are used to determine a minimum speed limit for the variable speed compressor. In an embodiment, the lubricant temperature used at 68 is the relative lubricant temperature instead of the lubricant temperature as measured. The minimum speed limit generally is dependent upon the refrigerant, the lubricant, the bearing size in the compressor, and the compressor performance. In an embodiment, as the bearing size decreases, the minimum speed limit increases. The minimum speed limits can be determined, for example, by testing or modeling discharge temperatures of the variable speed compressor relative to bearing cavity temperatures for the bearings in the variable speed compressor and performing a surface fit to determine a minimum speed limit equation. In general, when the bearing reaches a pitch velocity below or at or about 40,000 mm/min to at or about 550,000 mm/min, a minimum speed limit may be needed to prevent dilution loss of the lubricant film at the bearings. Accordingly, a pitch velocity below or at or about 150,000 mm/min may be considered a lower speed while above 400,000 mm/min may be considered a higher speed.

In another embodiment, the minimum compressor speed may be known, in which case the method in FIG. 2B can be modified to determine another variable such as, but not limited to, the lubricant temperature, the discharge temperature, or the like. In such an embodiment, the method in FIG. 2B can be used to, for example, control the discharge temperature or the lubricant temperature.

With reference to FIGS. 5A-5E, example minimum motor frequencies as determined according to the method 60 are shown for relative lubricant temperatures of 5° F. (FIG. 5A), 12° F. (FIG. 5B), 20° F. (FIG. 5C), 30° F. (FIG. 5D), and 40° F. (FIG. 5E), according to an embodiment. FIGS. 5A-5E represent a selected bearing size. It will be appreciated that the minimum motor frequency plot in FIGS. 5A-5E are dependent upon a refrigerant selected (e.g., R134a, etc.), a bearing size, and a lubricant selected. In the figure, the saturated suction temperature (in ° F.) and the saturated discharge temperature (in ° F.) are plotted against the minimum motor frequencies. The motor frequencies are represented from relatively lower to relatively higher. As shown in the figures, at lower saturated suction and saturated discharge temperatures, and lower relative lubricant temperatures, the minimum motor frequency is relatively lower than at relatively higher saturated suction and saturated discharge temperatures and higher relative lubricant temperatures. The lubricant viscosity may generally improve as saturated suction and saturated discharge temperatures increase. However, in an embodiment, there may be a point at which the lubricant viscosity decreases with increasing saturated suction temperature and saturated discharge temperature.

Figure 3:
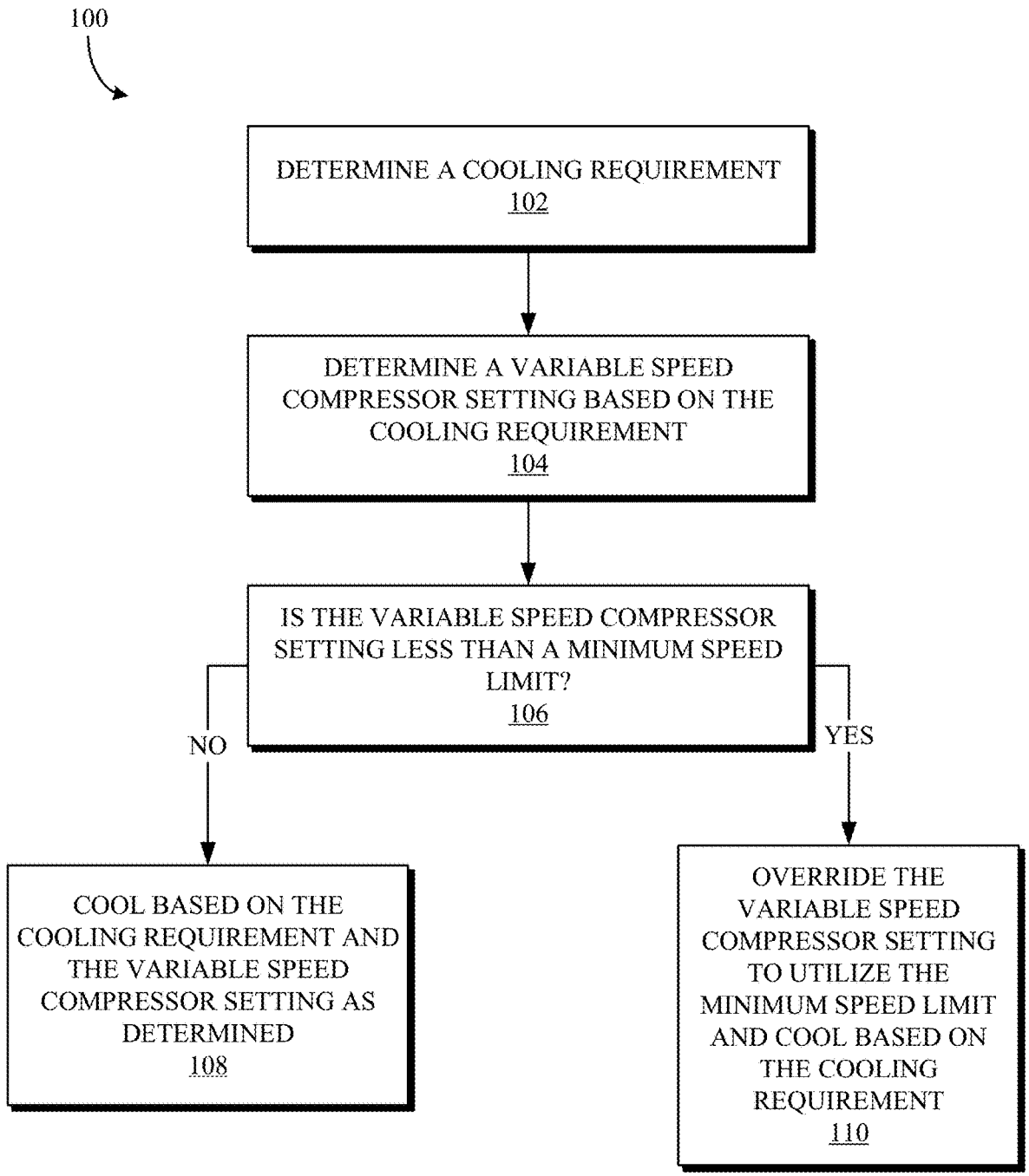
FIG. 3 is a flowchart of a method for operating a variable speed compressor to maintain a minimum bearing lubricant film thickness, according to an embodiment.

FIG. 3 is a flowchart of a method 100 for operating a variable speed compressor (e.g., the compressor 12 in FIG. 1) to maintain a minimum bearing lubricant film thickness, according to an embodiment. The method 100 generally includes operating an HVACR system (e.g., refrigerant circuit 10 in FIG. 1) based on a cooling requirement and a minimum speed limit.

The method 100 begins at 102. At 102, a controller (e.g., a thermostat or the like) determines a cooling requirement. The cooling requirement may be determined based on a setting in the thermostat, one or more sensors in a conditioned space, a building automation system, and/or a controller of the HVACR system (e.g., the refrigerant circuit 10 shown in FIG. 1), or the like.

At 104, the controller determines a variable speed compressor setting based on the cooling requirement. In an embodiment, this can include a target speed setting for the compressor 12. In an embodiment, this can include a speed setting for the compressor 12 that is less than its target speed. In an embodiment, the target speed may be the maximum speed.

At 106, the controller 26 determines whether the variable speed compressor setting as determined is less than a minimum speed limit (e.g., as determined in the method 50 in FIG. 2A or as determined in the method 60 in FIG. 2B).

At 108, the controller sets one or more cooling settings for the HVACR system based on the cooling requirement and the variable speed compressor setting as determined in 104.

At 110, if the variable speed compressor setting as determined in 104 was less than the minimum speed limit (e.g., as discussed in the method 50 in FIG. 2A or as discussed in the method 60 in FIG. 2B), the controller 26 overrides the variable speed compressor setting (e.g., as determined at 104) to utilize the minimum speed limit and cools according to the cooling requirement.

Aspects:

Any one of aspects 1-8 can be combined with any one of aspects 9-13, and 14-21. Any one of aspects 9-13 can be combined with any one of aspects 14-21.

Aspect 1. A heating, ventilation, air conditioning, and refrigeration (HVACR) system, comprising: a refrigerant circuit, including: a compressor, a condenser, an expansion device, and an evaporator fluidly connected; a controller electronically connected to the compressor, the controller configured to prevent the compressor from operating at a speed that is less than a minimum speed limit, wherein the controller is configured to determine the minimum speed limit based on a saturated suction temperature, a saturated discharge temperature, and a lubricant temperature.

Aspect 2. The HVACR system of aspect 1, wherein the lubricant temperature is a relative lubricant temperature, the relative lubricant temperature being a difference between a measured lubricant temperature and the saturated discharge temperature.

Aspect 3. The HVACR system of any one of aspects 1 or 2, wherein the controller is configured to override a cooling setting when the cooling setting corresponds to an operating speed for the compressor that is lower than the minimum speed limit.

Aspect 4. The HVACR system of any one of aspects 1-3, wherein the compressor is a variable speed screw compressor.

Aspect 5. The HVACR system of aspect 4, wherein the minimum speed limit is utilized for a bearing pitch velocity below at or about 40,000 mm/min to at or about 550,000 mm/min.

Aspect 6. The HVACR system of any one of aspects 1-5, wherein the HVACR system uses R134a as refrigerant.

Aspect 7. The HVACR system of any one of aspects 1-6, wherein the HVACR system uses a refrigerant having a relatively lower GWP than R134a.

Aspect 8. The HVACR system of any one of aspects 1-7, wherein the HVACR system uses R1234ze(E) or R513A as refrigerant.

Aspect 9. A method of controlling a variable speed compressor, comprising: determining, using a controller of the variable speed compressor, a saturated suction temperature, a saturated discharge temperature, and a lubricant temperature; calculating, using the controller of the variable speed compressor, a minimum speed limit for the variable speed compressor based on the saturated suction temperature, the saturated discharge temperature, and the lubricant temperature; receiving, by the controller, a cooling requirement; determining a speed setting for the variable speed compressor based on the cooling requirement; and in response to determining that the speed setting is less than the minimum speed limit as calculated, overriding the speed setting and utilizing the minimum speed limit and cooling to meet the cooling requirement.

Aspect 10. The method of aspect 9, wherein in response to determining that the speed setting is greater than the minimum speed limit, cooling based on the speed setting to meet the cooling requirement.

Aspect 11. The method of one of aspects 9 or 10, wherein the calculating is based on the saturated suction temperature, the saturated discharge temperature, the lubricant temperature, a bearing size, and a compressor efficiency.

Aspect 12. The method of any one of aspects 9-11, wherein the variable speed compressor utilizes R1234ze(E) as refrigerant.

Aspect 13. The method of any one of aspects 9-12, wherein the minimum speed limit is utilized for a bearing pitch velocity below at or about 40,000 mm/min to at or about 550,000 mm/min.

Aspect 14. A heating, ventilation, air conditioning, and refrigeration (HVACR) system, comprising: a refrigerant circuit, including: a compressor, a condenser, an expansion device, and an evaporator fluidly connected; a controller electronically connected to the compressor, the controller configured to prevent the compressor from operating at a speed that is less than a minimum speed limit.

Aspect 15. The HVACR system of aspect 14, wherein a lubricant temperature is a relative lubricant temperature, the relative lubricant temperature being a difference between a measured lubricant temperature and the saturated discharge temperature.

Aspect 16. The HVACR system of any one of aspects 14 or 15, wherein the controller is configured to override a cooling setting when the cooling setting corresponds to an operating speed for the compressor that is lower than the minimum speed limit.

Aspect 17. The HVACR system of any one of aspects 14-16, wherein the compressor is a variable speed screw compressor.

Aspect 18. The HVACR system of aspect 17, wherein the minimum speed limit is utilized for a bearing pitch velocity below at or about 40,000 mm/min to at or about 550,000 mm/min.

Aspect 19. The HVACR system of any one of aspects 14-18, wherein the HVACR system uses R134a as refrigerant.

Aspect 20. The HVACR system of any one of aspects 14-19, wherein the HVACR system uses a refrigerant having a relatively lower GWP than R134a.

Aspect 21. The HVACR system of any one of aspects 14-20, wherein the HVACR system uses R1234ze(E) or R513A as refrigerant.

The terminology used in this specification is intended to describe particular embodiments and is not intended to be limiting. The terms "a," "an," and "the" include the plural forms as well, unless clearly indicated otherwise. The terms "comprises" and/or "comprising," when used in this specification, specify the presence of the stated features, integers, steps, operations, elements, and/or components, but do not preclude the presence or addition of one or more other features, integers, steps, operations, elements, and/or components.

With regard to the preceding description, it is to be understood that changes may be made in detail, especially in matters of the construction materials employed and the shape, size, and arrangement of parts without departing from the scope of the present disclosure. This specification and the embodiments described are exemplary only, with the true scope and spirit of the disclosure being indicated by the claims that follow.

What is claimed is:

1. A heating, ventilation, air conditioning, and refrigeration (HVACR) system, comprising:
    a refrigerant circuit, including:
        a variable speed compressor, a condenser, an expansion device, and an evaporator fluidly connected;
        a controller electronically connected to the variable speed compressor, the controller configured to:
            determine a speed setting for the variable speed compressor based on a cooling requirement, and
            prevent the variable speed compressor from operating at a speed that is less than a minimum speed limit based on a saturated suction temperature, a saturated discharge temperature, and a lubricant temperature.

2. The HVACR system of claim 1, wherein the lubricant temperature is a relative lubricant temperature, the relative lubricant temperature being a difference between a measured lubricant temperature and the saturated discharge temperature.

3. The HVACR system of claim 1, wherein the controller is configured to override a cooling setting when the cooling setting corresponds to an operating speed for the variable speed compressor that is lower than the minimum speed limit.

4. The HVACR system of claim 1, wherein the minimum speed limit is utilized for a bearing pitch velocity below at or about 40,000 mm/min to at or about 550,000 mm/min.

5. The HVACR system of claim 1, wherein the HVACR system uses R134a as refrigerant.

6. The HVACR system of claim 1, wherein the HVACR system uses a refrigerant having a relatively lower GWP than R134a.

7. The HVACR system of claim 1, wherein the HVACR system uses R1234ze(E) or R513A as refrigerant.

8. A method of controlling a variable speed compressor, comprising:
    determining, using a controller of the variable speed compressor, a saturated suction temperature, a saturated discharge temperature, and a lubricant temperature;
    calculating, using the controller of the variable speed compressor, a minimum speed limit for the variable speed compressor based on the saturated suction temperature, the saturated discharge temperature, and the lubricant temperature;
    receiving, by the controller, a cooling requirement; determining a speed setting for the variable speed compressor based on the cooling requirement; and
    in response to determining that the speed setting is less than the minimum speed limit as calculated, overriding the speed setting and utilizing the minimum speed limit and cooling to meet the cooling requirement.

9. The method of claim 8, wherein in response to determining that the speed setting is greater than the minimum speed limit, cooling based on the speed setting to meet the cooling requirement.

10. The method of claim 8, wherein the calculating is based on the saturated suction temperature, the saturated discharge temperature, the lubricant temperature, a bearing size, and a compressor efficiency.

11. The method of claim 8, wherein the variable speed compressor utilizes R1234ze(E) or R513a as refrigerant.

12. The method of claim 8, wherein the minimum speed limit is utilized for a bearing pitch velocity below at or about 40,000 mm/min to at or about 550,000 mm/min.

13. A heating, ventilation, air conditioning, and refrigeration (HVACR) system, comprising:
  a refrigerant circuit, including:
    a variable speed compressor, a condenser, an expansion device, and an evaporator fluidly connected; and
    a controller electronically connected to the variable speed compressor, the controller configured to: determine a speed setting for the variable speed compressor based on a cooling requirement, and prevent the variable speed compressor from operating at a speed that is less than a minimum speed limit, wherein the controller is configured to determine the minimum speed limit based on a bearing size, an efficiency of the variable speed compressor, a saturated suction temperature, a saturated discharge temperature, and a lubricant temperature.

14. The HVACR system of claim 13, wherein the lubricant temperature is a relative lubricant temperature, the relative lubricant temperature being a difference between a measured lubricant temperature and the saturated discharge temperature.

15. The HVACR system of claim 13, wherein the controller is configured to override a cooling setting when the cooling setting corresponds to an operating speed for the variable speed compressor that is lower than the minimum speed limit.

16. The HVACR system of claim 13, wherein the minimum speed limit is utilized for a bearing pitch velocity below at or about 40,000 mm/min to at or about 550,000 mm/min.

17. The HVACR system of claim 13, wherein the HVACR system uses R134a as refrigerant.

18. The HVACR system of claim 13, wherein the HVACR system uses a refrigerant having a relatively lower GWP than R134a.

19. The HVACR system of claim 13, wherein the HVACR system uses R1234ze(E) or R513A as refrigerant.

* * * * *